United States Patent [19]

Ganson

[11] Patent Number: 4,522,475
[45] Date of Patent: Jun. 11, 1985

[54] APPARATUS AND METHOD FOR SHOWING MOTION IN A SINGLE PHOTOGRAPH

[76] Inventor: John P. Ganson, 14 Lincoln Rd., Wayland, Mass. 01778

[21] Appl. No.: 565,343

[22] Filed: Dec. 27, 1983

[51] Int. Cl.³ .................. G03B 19/18; G03B 21/32
[52] U.S. Cl. .................................. 352/39; 352/84; 356/23
[58] Field of Search ............... 352/39, 84; 355/37; 356/23

[56] References Cited

U.S. PATENT DOCUMENTS 2,663,217 12/1953 Tuttle et al. .................. 352/39
3,825,335 7/1974 Reynolds .................... 355/37

Primary Examiner—Monroe H. Hayes
Attorney, Agent, or Firm—Kenway & Jenney

[57] ABSTRACT

An apparatus and method for showing motion in a single color photograph in which motion of an object is shown by displaced images of the object in different colors. The scene to be photographed is illuminated by a light source including a plurality of light units emitting light of differing spectral composition. The light units are individually and sequentially activated, the light emitted from all of the units appearing to be emitted from substantially the same location. The flashing of the light units is controlled by a timer. The resulting photograph shows the non-moving objects in a color which is the composite of the spectral composition of all of the light units, typically the natural color. The movement of an object is shown by a spaced series of sharp images of that object in a variety of colors. The color sequence corresponds to the sequence of the flashes of the light units.

14 Claims, 4 Drawing Figures

APPARATUS AND METHOD FOR SHOWING MOTION IN A SINGLE PHOTOGRAPH

BACKGROUND OF THE INVENTION

This invention relates to color photography, and more particularly to a method for showing motion in a color photograph.

Over the years a number of devices and methods have been employed to portray motion in a single color photograph. One of the simplest of these known methods involves the use of a time exposure. With a time exposure, the camera is aimed at the subject to be photographed, and the shutter is kept open while the subject is in motion. The resulting photograph shows an object in motion as a blur against a sharply focused background, including the stationary objects. While this method does show which objects in a photograph are moving, it is not very useful for revealing pertinent data concerning the nature of the motion, such as the speed of the object in motion.

Another known method of showing motion in a photograph involves the combining of a series of short-duration flash exposures in which the moving subject is photographed in a series of successive spaced positions. These combined exposures produce a photograph in which the image of non-moving objects are superimposed so that such objects appear as they would in a single exposure, and in which the moving objects appear as a number of sharp, spaced images in the combined photograph, all in the same colors.

Furthermore, it is possible to show motion by combining the two above discussed methods. By combining a high speed flash with a time exposure, an object can be shown sharply by the flash in conjunction with a related blurred image caused by the time exposure.

Another known apparatus and method for showing motion in a still photograph involves the use of a Harris shutter. The Harris shutter, which is described in *More Joys of Photography* (by the editors of Eastman Kodak Company, Addison Wesley Publishing Company, 1981), involves the use of a number of colored filters which are passed in rapid succession in front of a lens during a time exposure. Any object which moves during the exposure is recorded as spaced images in variegated colors, and the remainder of the scene which does not move is photographed in the natural color. Typically, the Harris shutter makes three exposures of the scene, each through a different colored filter. The reason stationary objects look natural is that the three filters transmit, sequentially, the primary colors in white light, i.e., red, green and blue, and all three images are superimposed. Each of the three filters lets in parts of the light blocked by the other filters, so that the cumulative effect is about the same as if the scene has been exposed without filters. Anything that moved during the exposure, however, will be recorded in multiple colors as spaced images because the moving object's position changes with the changing of the filter. One problem associated with the Harris shutter arises from the difficulty of forming sharply focused images of rapidly moving objects because of limitations on the speed of changing the filters. A Harris shutter device which would be capable of showing high speed movement would probably be costly to construct.

It is therefore a principal object of the present invention to provide a simple apparatus and method for showing movement in a single color photograph without the necessity of providing a Harris-type moving shutter.

A second object is to provide an apparatus and method for showing motion in a single color photograph in which the necessary equipment is relatively inexpensive to construct.

Another object is to provide an apparatus and method for showing motion in a single color photograph which can effectively display the movement of an object in a manner that provides pertinent measurable data concerning the motion, such as the speed.

Still another object of the present invention is to provide an apparatus and method for showing motion in a single color photograph in which sharply focused images of the scene being photographed including moving objects, is produced.

SUMMARY OF THE INVENTION

According to the present invention, an apparatus and method for showing motion in a color photograph is disclosed in which a scene to be photographed is illuminated by light of a selected spectral composition. The light source which illuminates the photograph, preferably comprises a plurality of individual light units which provide the component colors of the chosen spectral composition. The light from all the units illuminates the scene from substantially the same apparent location. In order to have the light appear to strike the subject of the photograph from the same direction, the light is conducted from the separate units through an optical fiber bundle in which the light emitting ends of the optical fibers of all of the units are randomly interdispersed. A timer is connected to each of the individual light units so that they flash in rapid succession through the fiber optic bundle. It is also possible to use a light mixing chamber for providing an equivalent function.

In operation, a moving object is photographed while the various colors of light flash in a predetermined sequence for a predetermined duration of time. Controls are provided for adjusting the time intervals between the flashes, which will thereby control the total duration of the exposures. The resulting photograph shows the movement of an object by displaying the object at each of a sequence of positions; each image being in a different color. The displacements between the separate images of the object depend on its speed and direction of motion. The non-moving objects in the photograph are shown in the composite color of all of the flash units, which is the natural color if the units are suitably chosen and balanced to cover the visible spectrum. Further, the moving objects in the photograph appear as focused color images.

A particular advantage to be gained from the present invention is that accurate descriptive information concerning the motion of an object can be determined from an examination of the photograph. For example, a precise measurement of the speed of an object's motion can be determined from measurement of the time duration of the flash, and then measuring the distance from one colored representation of the moving object to an adjacent colored representation of the same moving object. In addition to the speed of an object, acceleration and the travel path of an object can also be easily determined. This apparatus and method of showing motion in a photograph will be better understood from the following description of the apparatus for carrying out this method.

The above and other features and objects of the invention will become apparent to those skilled in the art from the following detailed description and with reference to the accompanying drawings.

DETAILED DESCRIPTION OF THE PREFERRED EMBODIMENT

Figure 1:
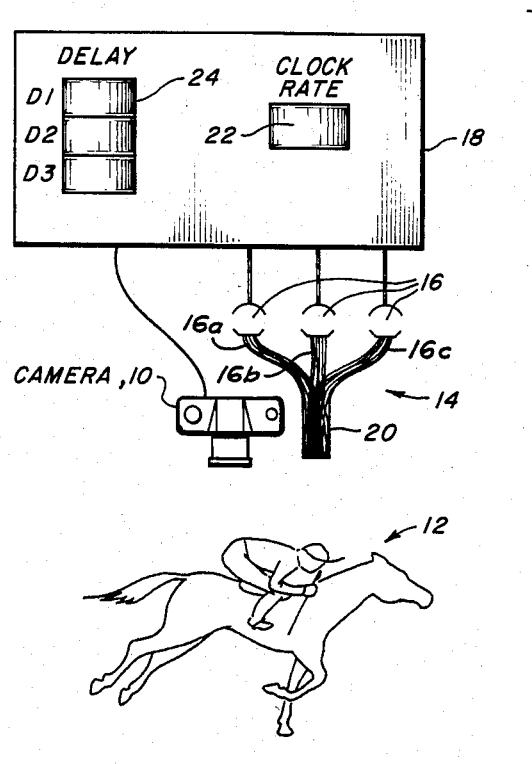
FIG. 1 is a partially schematic diagram of the presently preferred embodiment of a system for carrying out the method of the present invention.

In the embodiment of FIG. 1, there is shown the presently preferred apparatus for carrying out the method of the present invention. A camera 10 is positioned with its lens facing the scene 12 to be photographed. A light source 14 including a number of individual light units 16 is connected to a timing device 18. The light units 16 provide light of different spectral compositions. The colors are spacially merged, preferably by a fiber optic light mixing system 20. For each of the light units 16 there is a corresponding bundle of optical fibers 16a, 16b or 16c having light-receiving ends located to receive light from that particular source, and light-emitting ends uniformly and randomly dispersed over the same area as that over which there are also similarly dispersed the light-emitting ends of the bundles corresponding to each other light unit in use. The light emitted from the fiber optic light mixing system 20 is projected onto the scene 12 which is being photographed.

The design of the light source 14 is of particular importance. There are four essential considerations. These are the duration, interval, color and direction of the light.

The duration of the light refers to the length of time any component of the light source 14 is activated. When flash or strobe units are used, the duration refers to the length of time a light unit 16 is activated.

The interval of the light refers to the time period between activations of successive light units 16. When the activation of the light units is graphed as a function of time as in FIG. 2 the interval is represented by the time between the rising edges of successively activated units and the duration is the time between a rising and falling edges of a single pulse activating a unit 16. The duration and the interval must be properly matched to the subject being photographed. For example, if one desired to photograph small very rapidly moving objects, strobe units whose duration is 1/5000 second could be used with an interval of about 1/5000 second.

The color of the light refers to the spectral content of the filtered light output of each light unit 16 as it relates to the color of all lights taken together. The colors chosen for the respective units can be coordinated with the color characteristics of the particular film in use. If one wished to photograph objects in normal color and the film is balanced for daylight (white light), it is preferred to use three flash units 16, one filtered by a red filter, one filtered by a blue filter and one filtered by a green filter. These colors are for the exposure of corresponding separation layers of a color film. If it is desired that the objects be photographed in a different color spectrum as when the photographer is constrained by a particular color cast, it may be desirable to use some other filter combination. An example of this is the examination of objects in a colored liquid wherein it is desirable to mute or eliminate the color of the liquid. In some cases it may be desirable to produce a photograph showing varying hues of a single color. In such a case, flashes of different intensities of the same color should be used. Finally, similar results can be obtained through the use of a black and white multi-emulsion layer film in which each layer is activated by a different intensity of light.

When referring to the direction of the light, an important feature is that, in many applications, the light from all sources which falls on the scene 12 being photographed must come from substantially the same apparent location. If the light from an individual unit 16 is not aligned properly with the light from the other units 16 in the source 14, there are likely to be unwanted color deviations in the individual color images. These deviations result from the fact that the color content of the light reflected from a subject changes with a change in the direction of the light impinging on it. While such deviations may be desirable for certain applications, they will usually interfere with color differentiation produced by the timing. In the illustrated embodiment, light from the three units is emitted from substantially the same location by using an interdispersed configuration of fiber optics. In another embodiment, a light mixing chamber can be used in place of the fiber optic bundle. The light mixing chamber may be similar to the known types used in photographic enlargers and "dichoric" light sources. However, any light mixing chamber commonly known in the art will perform this function.

Figure 2:
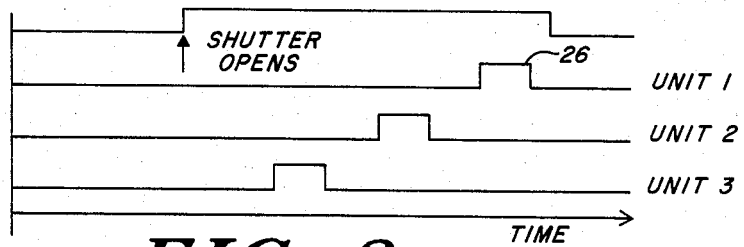
FIG. 2 is a graphical representation of the flash sequence for the various flash units.

Care must also be taken in the design of the timing circuit 18. Although the specific structure of the timer 18 is a matter of choice, it is important that it be capable of energizing the light units in a precise sequence. In the embodiment shown, the timer 18 includes a 4Mhz quartz clock and clock divider 22 which is set by a sixteen position switch to provide any one of sixteen possible clock periods ranging from 1 microsecond to 32 milliseconds. This timer also includes a synchronizer which receives a signal from the camera at the instant when the shutter opens to take a picture. The synchronizer announces the signal simultaneously with the next clock period, thereby initiating an exposure. When the camera shutter is thus opened, a preset delay period for each flash unit is enabled. Each of a number of delay units 24, one for each of the light units 16, is set by a sixteen-position thumb-wheel switch to give an independent time delay of from zero to 15 clock periods before energizing the corresponding flash unit 16. The synchronizer, upon receiving the signal from the shutter, gates the impulses from the clock divider to the delay units. The delay units count the impulses and energize the flash units 16 after the preset time intervals. A graphical example of a typical delay sequence is shown in FIG. 2. In this example a flash is designated as a peak 26 of square waveform, and it should be observed that each flash occurs after a corresponding preset delay following the opening of the shutter. Furthermore, while the graph of FIG. 2 shows all flash units activated separately, some of the flash units may be activated at the same time. The only limitation on the activation of the flash units is that all units may not be activated simultaneously.

In another embodiment the timer utilized was based on a so-called "555 timer integrated circuit". A timer of this type is described in "110 IC timer projects" by Jules H. Gilder (Hayden Book Company, Inc., 1979). In order to make this circuit adjustable, thyristors were added to accommodate the high voltage and current requirements of the strobe flash units. In any case, the timer used should be capable of providing time intervals appropriate to the speed of movement of the subject 12.

Figure 3A:
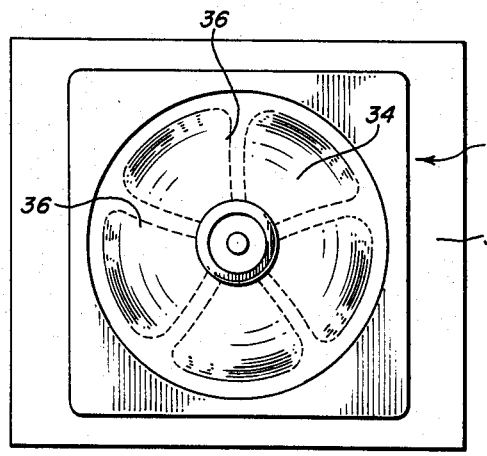
FIG. 3a is a view representing a photograph taken by a camera under conventional lighting conditions.
Figure 3B:
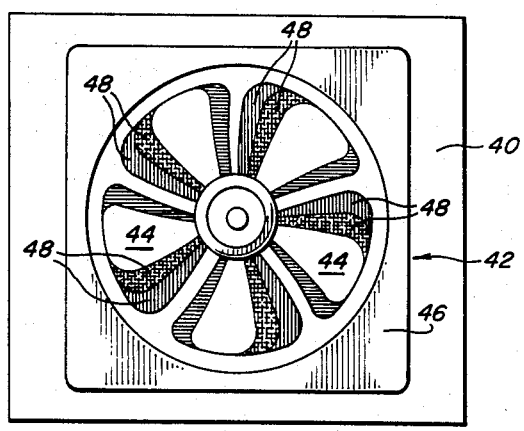
FIG. 3b is a view representing the same scene as that of FIG. 3a, when photographed by the method of the present invention.

The visual effect produced by the present invention is illustrated by a comparison of FIGS. 3a and 3b. In FIG. 3a there is shown a photograph 30 of a fan 32, the blades 34 of which are in motion. This photograph was taken under white light at a shutter speed which was not sufficiently short to produce a sharply focused image of the blades. All of the objects in the photograph appear in their natural colors under white light. The movement of the blades 34 in this photograph is shown by blurred areas as at 36.

FIG. 3b depicts a photograph 40 of the same fan 32 as in FIG. 3a, except that the photograph 40 is taken utilizing the apparatus and method of the present invention. This photograph was taken using white light flash units 16 respectively filtered by a #25 red filter, a #61 green filter and a #38 blue filter. The resulting photograph shows all of the non-moving objects, such as the frame 46 of the fan 42, in their natural colors under white light. The blades 44 which are moving are each shown as a series of three distinct, sharply focused, mutually displaced images represented at 48. The leading and trailing edges of each fan blade appear in different colors in the respective images.

The photograph 40 of FIG. 3b can be used to provide quantitative data concerning the movement of the blades of the fan 42. For example, in order to determine the speed of the blades 44 at any position of movement, a measurement of the width of a colored image 48 of the blade 44 at that position of movement is first taken. This measurement is then scaled up to the actual width of the blade, that is, the ratio of the actual width to the image width is computed. Then, given the known interval between the flashes, the speed of the blade 44 can be easily determined by multiplying this ratio by the measured distance between successive colored images of the same point on the blade and dividing by the known time interval between the flashes that produced those images. Other data obtainable from photographs produced in accordance with the present invention include determining whether there is in fact motion in the photographed scene and determining relative motion of a number of objects in a scene.

While the apparatus and method for showing motion in still photographs of the present invention has been described with reference to a preferred embodiment, various modifications and alterations will occur to those skilled in the art from the foregoing detailed description and the accompanying drawings. For example, diverse applications of this apparatus and method include the study of moving cells under a microscope, the study of turbulence around airplane wings in a wind tunnel, and the production of artistic designs. These and other modifications and variations are intended to fall within the scope of the appended claims.

What is claimed is:

1. Apparatus for color photography of a scene including a moving subject comprising, in combination,
    a camera having film capable of differentiating between components of a spectrum,
    a light source for illuminating the subject comprising a plurality of individual light units each adapted to emit a light flash primarily in a distinct portion of said spectrum, and
    a flash interval control connected to each of said individual light units and adapted to actuate said individual light units successively after predetermined time intervals.

2. The apparatus of claim 1, in which the light source includes light conductor means adapted to receive light from each of said individual light units and to project the light from all of said units on to the subject from substantially the same apparent location.

3. The apparatus of claim 2, in which the light conductor means comprises a fiber optical bundle.

4. The apparatus of claim 1 wherein each of said individual light units is adapted to produce a flash of short duration in comparison with the speed of motion of said subject.

5. The apparatus of claim 1 wherein each light unit comprises means to produce a flash and a filter to limit the light therefrom to said distinct portion of said spectrum.

6. The apparatus of claim 1 in which the camera has a shutter, and the flash interval control comprises a clock timer and clock divider, a synchronizer activated by the shutter to gate impulses from the clock timer and clock divider, and a delay unit for each light unit adapted to count the gated impulses and energize the light unit after a predetermined delay.

7. A method for showing motion of objects in a single photograph taken by a camera focused on the moving objects comprising the steps of
    providing a light source capable of emitting at least two colors of light;
    providing a timer connected to said light source for sequentially emitting each of said at least two colors of light;
    emitting said at least two colors of light in a flashing fashion from said light source, all of said at least two colors of light not flashing at the same time and any two successive flashes of light being flashes of the different colors;
    opening a shutter of said camera for a period of time in excess of the time period for a single flash of light from said light source;
    whereby the resulting photograph shows the motion of an object in various sequentially displayed colors corresponding to a sequence of said flashed colors of said at least two colors of light.

8. The method for showing motion in a single photograph of claim 7 wherein said light source is capable of emitting light from substantially the same apparent location and comprises a number of individual light units, the light from said light units being fed through a fiber optic bundle to the object being photographed.

9. The method for showing motion in a single photograph in claim 7 wherein said light source is capable of emitting light from substantially the same apparent location and comprises a light mixing chamber.

10. The method for showing motion in a single photograph of claim 7, wherein said timer is adjustable for changing a time interval between successive flashes of said at least two colors of light in order to show motion of objects moving at different speeds.

11. A method for showing motion of objects in a single photograph taken by a camera having a shutter focused on the moving objects comprising the steps of
providing a light source capable of emitting at least two different hues of the same color of light;
providing a timer connected to said light source for sequentially emitting flash colors each of said two hues of the same color of light;
emitting said at least two hues of the same color in a flashing fashion from said light source while said shutter is open, said at least two hues not flashing at the same time and any two successive flashes being flashes of different hues;
opening the shutter of said camera for a period of time in excess of the time period for a single flash of light from said light source;
whereby the resulting photograph shows a motion of an object in various sequentially displayed colors corresponding to a sequence of said flashed colors of said colors of light.

12. The method for showing motion in a single photograph of claim 11, wherein said light source is capable of emitting light from substantially the same apparent location and comprises a number of individual light-emitting units, the light from said light-emitting units being fed through a fiber optic bundle to the object being photographed.

13. The method for showing motion in a single photograph of claim 11, wherein said light source is capable of emitting light from substantially the same apparent location and comprises a light mixing chamber.

14. The method for showing motion in a single photograph of claim 11, wherein said timer is adjustable for changing a time interval between successive flashes of said at least two hues of the same color of light in order to show motion of objects moving at different speeds.

* * * * *

UNITED STATES PATENT AND TRADEMARK OFFICE
CERTIFICATE OF CORRECTION

PATENT NO. : 4,522,475
DATED : June 11, 1985
INVENTOR(S) : John P. Ganson

It is certified that error appears in the above-identified patent and that said Letters Patent is hereby corrected as shown below:

Column 7, line 7, cancel "flash colors" and substitute --flashes of--. Column 8, line 1, cancel "colors" and substitute --hues--.

Signed and Sealed this

Twenty-fifth Day of October, 1988

Attest:

DONALD J. QUIGG

Attesting Officer

Commissioner of Patents and Trademarks